May 30, 1961  R. C. JONES  2,986,034
AIR-BACKED THERMISTOR BOLOMETER
Filed Oct. 18, 1957

INVENTOR.
ROBERT CLARK JONES
BY
ATTYS George Sipkin

United States Patent Office 2,986,034
Patented May 30, 1961

2,986,034

AIR-BACKED THERMISTOR BOLOMETER

Robert C. Jones, Cambridge, Mass., assignor, by mesne assignments, to the United States of America as represented by the Secretary of the Navy Filed Oct. 18, 1957, Ser. No. 691,115

8 Claims. (Cl. 73—355)

This invention relates to bolometers, and particularly to thermistor bolometers for measuring minute quantities of radiant heat by changes in resistance in the thermistor strip or flake that is exposed to the radiations. The thermistor is a resistor made of a material having a relatively high thermal coefficient of resistance, whose resistance varies greatly with changes in temperature. Thermistors of this general type are well known in the art, several being described for example in U.S. Patents No. 2,414,792 and No. 2,414,793. Thermistor resistors of this type that are made from ceramic materials are available in the open market and are sometimes called flakes. Heretofore, the thermistor element or flake has commonly been supported upon and in spaced relation to a face of the large block of insulating material such as glass and the ends of the flake or thermistor element were cemented to the insulating support or glass by a phenol-formaldehyde type of resinous cement which required treatment under an elevated temperature to cause the cement to set. This heating to set the cement caused considerable difficulty, because the glass or other insulating material did not have the same coefficient of thermal expansion as the thermistor element or flake, and as a result the thermistor element or flake was often broken or damaged due to the unequal expansion of the thermistor element and its support.

An object of this invention is to provide an improved thermistor bolometer in which a phenol-formaldehyde resinous cement may be employed successfully to attach the thermistor element to the base or support, and to attach the circuit wire leads to the ends of the thermistor element without danger of breakage of, or damage to, the thermistor element or the base, and without the thermistor element becoming loosened from the support, and which will be relatively compact, durable, practical and inexpensive.

Another object of this invention is to provide an improved thermistor bolometer of the air-backed type which may be easily and quickly assembled, and which may be enclosed in an air-tight capsule or housing, and which will be relatively free from influence thereon of sound waves around the capsule or housing.

Another object is to provide an improved thermistor bolometer which will be particularly sensitive to infra-red radiation, which enables one to obtain and utilize radiation from one source alone, and which will not give a signal if the radiation is from different sources and of equal amounts.

Various other objects and advantages will appear from the following description of two embodiments of the invention, and the novel features will be particularly pointed out hereinafter in connection with the appended claims.

Figure 2:
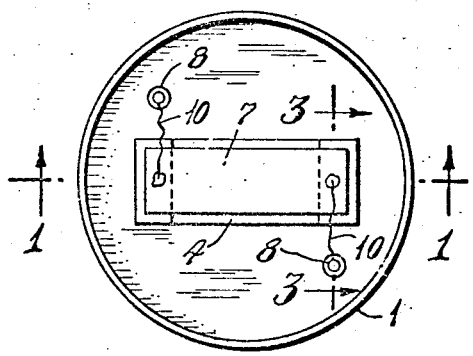
Fig. 2 is a plan of the same before the cover is applied.
Figure 5:
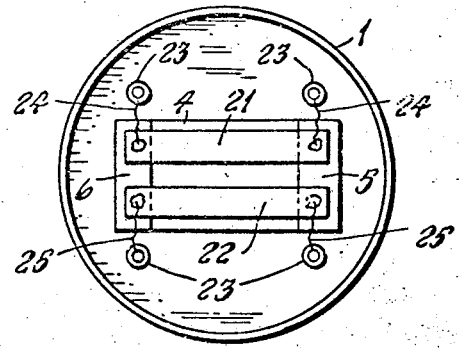
Figure 6:
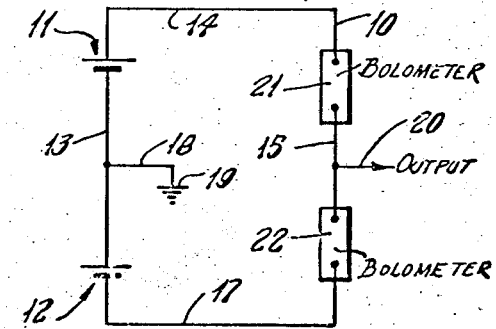

Fig. 5 is a plan similar to Fig. 2 but illustrating a modification of the device thereof, in which two separate thermistor elements or flakes are mounted side by side, but separately, on insulation carried by the base, and illustrating one manner of establishing separate connections to the thermistor flakes or elements; and Fig. 6 is a circuit diagram illustrating one manner in which the two thermistor flakes or elements may be connected in an operating circuit.

In the embodiment of the invention illustrated in Figs. 1–4 the bolometer includes a cup-like housing 1 which is normally closed by a cover 2 carrying a transparent window 3 of a material that transmits infra-red rays. On the bottom of the housing beneath the window 3 is secured a base 4 of substantial size, and mounted on opposite ends of the top of base 4 are two insulating blocks 5 and 6 which are fixed in position thereon. A thermistor element or flake 7 extends between the blocks 5 and 6 and rests on the upper face thereof beneath the window 3. The ends of the element 7 are secured to the blocks 5 and 6. The blocks 5 and 6 extend slightly higher than the upper face of the base 4, so that the element 7 will be spaced somewhat from the upper face of the base 4. The cup-shaped housing 1 and its cover 2 are preferably formed of metallic silver, with the cover soldered in closed position. The window 3 is preferably made of silver chloride which is transparent, transmits infra-red rays, and can be soldered to the cover 2.

Figure 1:
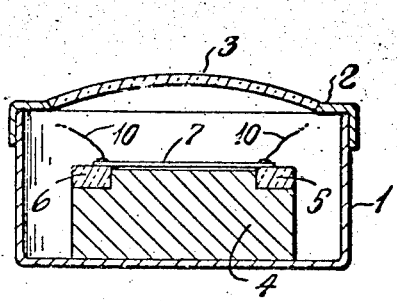
Fig. 1 is a longitudinal sectional elevation through a thermistor bolometer constructed in accordance with this invention, the section being taken approximately along the line 1—1 of Fig. 2, but with the cover in place.
Figure 3:
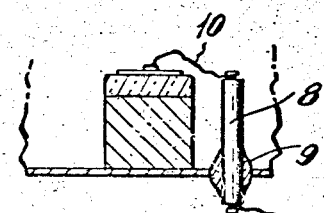
Fig. 3 is a sectional elevation through a portion of the device shown in Figs. 1 and 2, with the section taken approximately along the line 3—3 of Fig. 2.

The base 4 is preferably made of an iron-nickel alloy such as invar or of a glass sealing alloy containing about 20% nickel, 17% cobalt, 0.2% manganese and the balance iron. An alloy such as that last named is marketed under the trade name "Kovar." The invar is a low thermal expansion nickel steel particularly designed for thermostatic elements. Each of these two alloys has approximately the same coefficient of thermal expansion as the thermistor material, which is preferably a ceramic material, and since the base 4 and the thermistor element 7 have the largest amounts of expansion, it is possible to use small blocks 5 and 6 of any insulating material, preferably of glass, since the thermistor elements at their ends can be secured to the glass blocks by a phenol-formaldehyde resinous cement and the resinous cement set by heating. The blocks 5 and 6 are of course secured or anchored in a suitable manner to the base 4. Suitable posts 8, Figs. 2 and 3, are passed upwardly through the bottom of the housing 1, and sealed therein by glass 9 as is common practice. The upper or inner ends of the posts are connected one to each end of the thermistor element 7 by lead wires 10.

Figure 4:
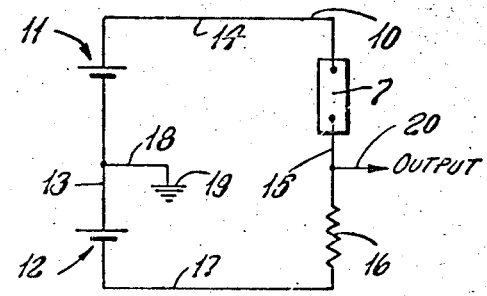
Fig. 4 is a circuit diagram illustrating one manner in which the thermistor bolometer may be used.

A circuit in which such a single thermistor element may be used is illustrated in Fig. 4 where two sources of direct current 11 and 12, such as batteries, are connected in series with each other by a wire 13. The battery 11 is connected by wire 14 to the lead 10 that is connected to one end of the thermistor strip 7, and the other end of that thermistor strip is connected by a wire 15 to one end of a resistance 16, such as a load resistance, the other end of which is connected by a wire 17 to the other battery 12, which provides a closed circuit in which the batteries, the thermistor element and the resistance are all connected in series.

A tap 18 is connected to the wire 13 between the batteries 11 and 12, and also connected to ground 19, and an output lead 20 is connected to the wire 15 that connects one end of the thermistor element 7 to the resistance 16. With such an arrangement if infra-red radiation strikes the thermistor element 7 a plus signal having a voltage dependent upon the intensity of such radiation is delivered to an external circuit through output wire 20 and the ground connection 19.

In the embodiment of the invention illustrated in Figs. 5 and 6, the construction is the same as in Figs. 1–4, except that the block 4 is made wider, the insulating blocks 5 and 6 are made longer, and two thermistor elements 21 and 22 are mounted on the blocks 5 and 6 to extend therebetween, side by side, but in spaced relation to one another. In this embodiment four posts 23 extend upwardly through the bottom of the cup shaped housing part 1 and are sealed therein as in Figs. 1–3, and two of these posts are connected by wires 24 to the opposite ends of one thermistor element 21 and the other two posts are connected by wires 25 to the opposite ends of the thermistor element 22. Otherwise the construction is the same as in Figs. 1–3.

A suitable circuit for using the two thermistor elements is illustrated in Fig. 6, which is identical with the circuit shown in Fig. 4 except that the thermistor element 7 is replaced by the thermistor element 21 and the resistance 16 is replaced by the thermistor element 22, and parts similar to those in Figs. 1–4 are given the same numerals. With this arrangement when the infra-red radiations entering transparent window 3 strike one thermistor element such as 21, a plus signal is delivered to the external circuit including wires 18 and 20. If the radiation strikes only the thermistor element 22, a negative signal is delivered to the external circuit. If the radiation strikes both thermistor elements equally, the plus and minus signals delivered to the output circuit including wires 18 and 20 cancel each other. Thus, if radiation from a target emitting heat strikes thermistor element 21 and radiation from the sky strikes the other element 22, the output circuit will emphasize the target in comparison with the radiation from the sky.

It will be observed that by making the base 4 of a nickel-iron alloy, or nickel-steel alloy, which has approximately the same coefficient of thermal expansion as the thermistor element or flake 7, 21 or 22, it is possible to use a phenol-formaldehyde type of cement to unite the thermistor element or flake to the base, because in heating the same to cause the cement to set, the approximately equal thermal expansion and construction of the base and thermistor element or flake will result in no damage to the thermistor element. With this arrangement the glass insulating blocks at the ends of the base 4 may be used to facilitate attachment of the ends of the thermistor element to the base, because such pieces of glass are relatively short in the direction of thermal expansion and will not materially affect the normal thermal expansion and contraction of the base and thermistor element. Glass is particularly desirable as the insulating blocks because the cement will adhere thereto readily, and withstand the heating necessary to cause it to set. Hence, glass is preferred as the material of the insulating blocks, but other insulating blocks which will withstand the necessary heating may also be employed.

In this type of device it is important to have a rarified atmosphere within the housing, because if there is much air in the housing, external soundwaves will be likely to cause microphonic vibrations of the thermistor element or flake and thus cause noise. It is difficult to remove a sufficient amount of the air which will eliminate danger from these microphonic vibrations, and therefore the housing is preferably partially exhausted and the remaining air displaced by a small amount of helium gas, such as will provide about 2 mm. of pressure in the housing. This has been found to eliminate any sound noises in the circuits.

It will be understood that various changes in the details, materials and arrangement of parts, which have been herein described and illustrated in order to explain the nature of the invention, may be made by those skilled in the art within the principle and scope of the invention as expressed in the appended claims.

I claim:

1. A thermistor bolometer comprising a closed housing having a transparent window that transmits infrared rays a base in said housing, secured to a wall of the housing and having an exposed face towards said window, small electrically insulating blocks secured in spaced relation to each other on said exposed face of said base, a thermistor element extending between, fixed to, and supported at its ends by said blocks in proximity to but spaced relation to said base, electrically conducting leads extending into said housing from the exterior thereof and electrically connected to the ends of said element, said base being metallic and having substantially the same coefficient of thermal expansion as said thermistor element.

2. The thermistor bolometer, as set forth in claim and said housing containing a relatively small atmosphere of helium gas and approximately free of air.

3. The thermistor bolomoeter, as set forth in claim and said base being formed of a low thermal expansion alloy containing approximately 20% nickel, 17% cobalt 0.2% manganese, and the balance iron.

4. The thermistor bolometer, as set forth in claim wherein said base is formed of a low thermal expansion alloy containing nickel and iron, said insulating block are formed of glass, and said thermistor element at i ends is cemented to said glass.

5. The thermistor bolometer, as set forth in claim wherein said base is formed of a low thermal expansion alloy containing nickel and iron, said insulating block are formed of glass, and said thermistor element at i ends is cemented to said glass and said housing containing a relatively small atmosphere of helium gas and approximately free of air.

6. The thermistor bolometer, as set forth in claim and a circuit having two sources of direct current connected in series with each other and with said thermistor element, a load resistance also in series with said element in said circuit, a ground connection to said circuit between said sources of current, and an output electrical connection leading from and connected to said circuit between said thermistor element and said resistance.

7. A thermistor bolometer comprising a closed housing having a transparent window that transmits infrared rays a metallic base element in said housing and secured there in to a housing wall with an exposed face of the element towards said window on which may fall infrared ra passing through said window, small blocks of electrical insulating material secured in pairs on said exposed face the pairs being spaced apart, and the blocks of each pair being also spaced apart, a pair of thermistor elements, o for each pair of blocks and extending between and fix to the blocks of that pair and in spaced relation to sa exposed face of said base, electrically conducting circuit leads extending into said housing and electrically co nected to said thermistor elements, said base having su stantially the same coefficient of thermal expansion said thermistor elements, said housing having a rarifi atmosphere containing a gas offering a minimum proper of transmission of sound waves.

8. The thermistor bolometer as set forth in claim and a closed electric circuit having in series there two sources of electric direct current and said tv thermistor elements, a ground connection to the circuit between said two sources of current and an output co nection to the circuit between said thermistor elemen References Cited in the file of this patent

UNITED STATES PATENTS

| 1,553,789 | Moeller | Sept. 15, 19 |
| 2,163,798 | Mucher | June 27, 19 |
| 2,389,915 | Kleimack et al. | Nov. 27, 19 |

(Other references on following page)

UNITED STATES PATENTS

| | | |
|---|---|---|
| 2,414,792 | Becker | Jan. 28, 1947 |
| 2,423,476 | Billings et al. | July 8, 1947 |
| 2,516,873 | Havens et al. | Aug. 1, 1950 |
| 2,587,674 | Aiken | Mar. 4, 1952 |
| 2,649,571 | Smith | Aug. 18 1953 |
| 2,683,245 | Wunsch | July 6, 1954 |
| 2,686,293 | Davis | Aug. 10, 1954 |
| 2,739,212 | Woolley et al. | Mar. 20, 1956 |

OTHER REFERENCES

A Wide Range Thermistor Radiometer, by Stoll published in Review of Scientific Instruments, vol. 25, No. 2, Feb. 1954, pages 184, 187.

An Evaporated Gold Bolometer, by Archbold published in Journal of Scientific Instruments, vol. 34, June 1957, pages 240–242.